(12) United States Patent
Martin et al.

(10) Patent No.: US 6,397,877 B1
(45) Date of Patent: Jun. 4, 2002

(54) BLOWDOWN MANIFOLD EVACUATOR FOR NUCLEAR POWER PLANTS

(75) Inventors: Clifford B. Martin, Somers; Daniel A. Peck, South Windsor, both of CT (US)

(73) Assignee: Westinghouse Electric Company LLC, Pittsburgh, PA (US)

( * ) Notice: Subject to any disclaimer, the term of this patent is extended or adjusted under 35 U.S.C. 154(b) by 0 days.

(21) Appl. No.: 09/549,527

(22) Filed: Apr. 14, 2000

(51) Int. Cl.⁷ .............................................. F16K 24/00
(52) U.S. Cl. ..................... 137/183; 137/171; 137/177; 137/183; 137/814; 137/821; 137/624.27; 376/283
(58) Field of Search ................................ 137/171, 177, 137/183, 624.27, 814, 821; 376/283

(56) References Cited

U.S. PATENT DOCUMENTS

| | | | |
|---|---|---|---|
| 3,654,946 A | * 4/1972 | Wieme .................... 137/81.5 |
| 3,967,637 A | * 7/1976 | Jackson ...................... 137/110 |
| 4,158,603 A | 6/1979 | Kühnel .......................... 176/38 |
| 4,172,009 A | 10/1979 | Simon et al. ................... 176/38 |
| 4,313,470 A | * 2/1982 | Tippetts ....................... 137/821 |
| 4,822,557 A | * 4/1989 | Suzuki et al. ................ 376/282 |
| 4,927,596 A | * 5/1990 | Minnick ...................... 376/283 |
| 5,000,214 A | * 3/1991 | Pelkey |
| 5,096,659 A | * 3/1992 | Hidaka et al. ............... 376/283 |
| 5,149,492 A | 9/1992 | Arai et al. .................... 376/283 |
| 5,223,209 A | * 6/1993 | Eckardt ....................... 376/283 |
| 5,353,318 A | 10/1994 | Gluntz ........................ 376/283 |
| 5,473,647 A | * 12/1995 | Eckadrdt |
| 5,501,246 A | * 3/1996 | Burns et al. |
| 5,802,128 A | * 9/1998 | Couturier .................... 376/283 |
| 5,806,553 A | * 9/1998 | Sidwell |
| 6,088,418 A | * 7/2000 | Martin ........................ 376/283 |

FOREIGN PATENT DOCUMENTS

| | | | | |
|---|---|---|---|---|
| DE | 2614620 | | 2/1979 | |
| DE | 2805301 | | 2/1981 | |
| GB | 1469405 | * | 4/1977 | |
| GB | 2067822 A | * | 7/1981 | ........... G21C/15/18 |
| JP | 53008493 | | 1/1978 | |
| JP | 53025790 | | 3/1978 | |
| JP | 0162089 | * | 12/1979 | ............ G21C/9/00 |
| JP | 406222182 | * | 8/1994 | |

* cited by examiner

Primary Examiner—Michael J. Carone
Assistant Examiner—John Richardson

(57) ABSTRACT

A blowdown manifold for a nuclear power plant includes a main conduit section, at least one coolant exhaust conduit, and at least one fluidic device. The main conduit section is connected to a pressure relief system in the nuclear power plant. The coolant exhaust conduit has a first end coupled to the main conduit section and a second end extending into a receptacle. The fluidic device is in fluid communication with the main conduit and exhibits a lower flow resistance to air than to water and steam.

23 Claims, 2 Drawing Sheets

BLOWDOWN MANIFOLD EVACUATOR FOR NUCLEAR POWER PLANTS

BACKGROUND OF THE INVENTION

1. Field of the Invention

The present invention relates to the blowdown piping arrangement installed within the pressure relief system of a nuclear power plant. More specifically, the invention relates to a manifold within the pressure relief system that includes a fluidic device installed therein. The fluidic device provides a low flow resistance to air trapped within the exhaust piping of the relief system and a higher flow resistance to water and/or steam flowing through the pressure relief system piping upstream of the trapped air.

2. Description of Related Art

Nuclear power plants, including both the pressurized water reactor (PWR) design and the boiling water reactor (BWR) design, incorporate systems to prevent overpressurization of the main coolant system. Typically, these pressure relief systems are connected to the main coolant system, and comprise pressure relief valves, of various designs, that are designed to open at a specified pressure setpoint. If the main coolant system pressure reaches the specified setpoint, one or more pressure relief valves open, allowing primary coolant to flow through the valve, thereby lowering the pressure in the main coolant system.

The flow of primary coolant through the pressure relief system piping is directed into a manifold that typically includes one or more exhaust pipes. The exhaust pipes direct the primary coolant into a tank or reservoir, which may be partially filled with water. Moreover, in some plant designs, the exhaust pipes may be submerged, at least partially, into this water to facilitate condensation of the primary coolant discharged by the pressure relief system.

One problem that arises with the above-described conventional pressure relief system is that the air in the manifold and exhaust pipes is first driven out of the manifold and exhaust pipes before the vented primary coolant arrives at the exit of the exhaust pipes. This venting of the air can cause significant dynamic loads in the reservoir or tank, which can lead to damage.

SUMMARY OF THE INVENTION

It is therefore an object of the present invention to vent the air in the manifold and exhaust pipes to the surrounding atmosphere and subsequently allow only primary coolant to enter the tank or reservoir.

In one aspect of the present invention, a blowdown manifold for a nuclear power plant comprises a main conduit section, at least one coolant exhaust conduit, and at least one fluidic device. The main conduit section is in fluid communication with a pressure relief system in the nuclear power plant. The coolant exhaust conduit has a first end coupled to the main conduit section and a second end extending into a receptacle. The fluidic device is in fluid communication with the main conduit, and has a first fluid resistance to air and a second fluid resistance, higher than the first fluid resistance, to a fluid other than air.

In another aspect of the invention, a blowdown manifold connected to pressure relief system piping in a nuclear power plant comprises manifold means, exhaust piping means, and dual resistance flow means. The manifold means receives primary coolant flow from the nuclear power plant and directs the flow in a plurality of directions. The exhaust piping means receives the primary coolant from the manifold and directs the primary coolant into a receptacle. The dual resistance flow means presents a first flow resistance to air and a second flow resistance to the primary coolant, wherein the second flow resistance is higher than the first flow resistance.

These and other objects, aspects, advantages and features of the present invention will become more apparent to those skilled in the art when the following detailed description is read in conjunction with the accompanying drawings.

BRIEF DESCRIPTION OF THE DRAWINGS

In the following detailed description, reference will be made to the attached drawings in which.

DETAILED DESCRIPTION OF THE PREFERRED EMBODIMENTS

Figure 1:
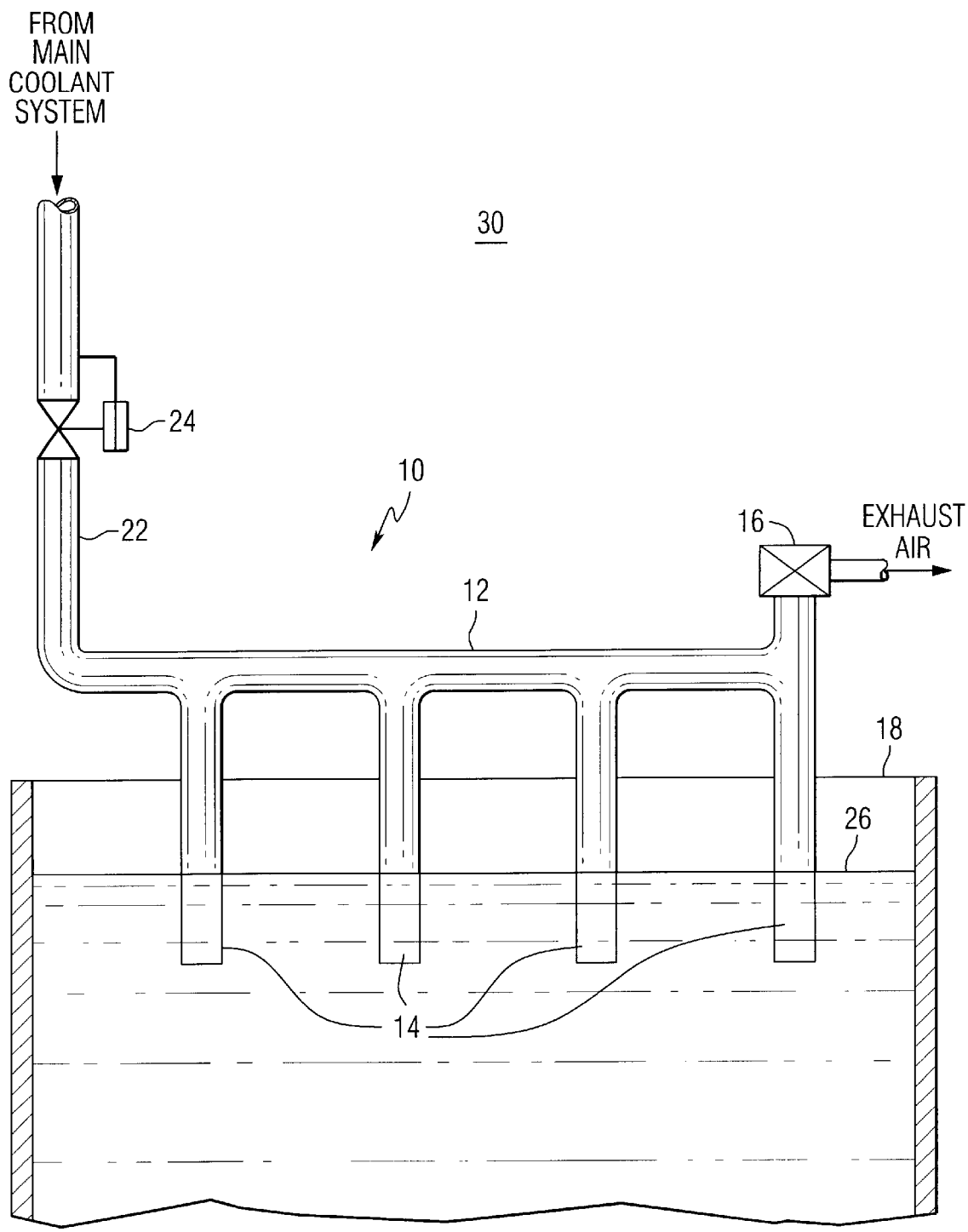
FIG. 1 is a partial piping system diagram showing the blowdown manifold evacuator according to a first embodiment of the present invention.

Referring now to FIG. 1, the blowdown manifold evacuator 10 includes a manifold 12, at least one coolant exhaust pipe 14, and a fluidic device 16. The manifold 12 is coupled to the pressure relief system piping 22 of the main coolant system (not shown). The manifold 12 will therefore receive the flow of primary coolant from the main coolant system in the event a relief valve 24 should lift.

FIG. 1 illustrates a plurality of coolant exhaust pipes 14, comprising the preferred embodiment. However, the ordinarily skilled artisan will realize that any number of exhaust pipes, including only one, could be used so long as there is sufficient flow therethrough to relieve adequately the pressure in the primary coolant system. The exhaust pipes 14 extend from the manifold 12 into a receptacle 18, which receives the coolant discharged through the exhaust pipes 14. The receptacle 18 may be partially filled with water 26 to a level wherein the exhaust pipes are partially immersed. By doing so, condensation of the coolant being received in the receptacle 18 is facilitated.

The fluidic device 16, which is positioned so as to not be immersed in the water 26, exhibits a lower flow resistance to air than it does to steam and water. Therefore, if a pressure relief valve 24 opens, allowing primary coolant to flow into the manifold 12, the air within the manifold 12 and piping 14, 22 downstream of the primary coolant flow will be vented out through the fluidic device 16 and into the surrounding atmosphere 30 (such as the reactor containment building). The fluidic device 16 would also restrict, or fully prevent, the flow of the primary coolant through it, thereby forcing the primary coolant to flow through the exhaust pipes 14 and into the receptacle 18.

The fluidic device 16 may be any one (or a plurality) of several types of devices. By way of non-limiting examples, the fluidic device 16 could be a passive device such as a spring-loaded check valve, a fluidic diode, or a venturi, or any combination thereof. The spring-loaded check valve is normally open and allows air to pass therethrough, but closes when higher density water or steam begins to pass. A fluidic diode is a device that passes water in one direction but causes an eddy flow in the reverse direction to restrict backward flow. This device allows air to pass through more easily than water or steam in the reverse direction. The venturi, when sized correctly, allows air to pass through relatively easily, while choking the flow of water and steam.

Figure 2:
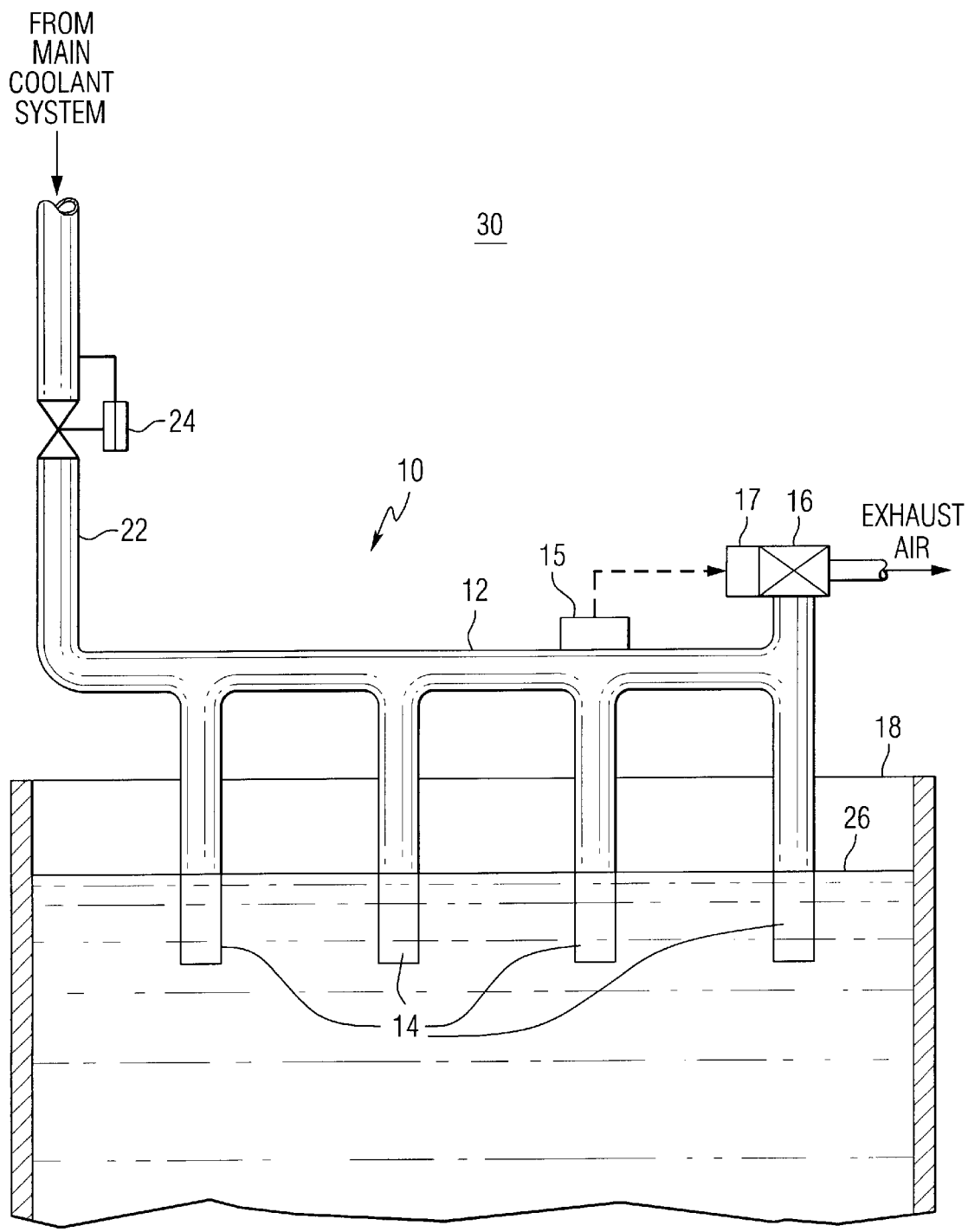
FIG. 2 is a partial piping system diagram showing the blowdown manifold evacuator according to a second embodiment of the present invention.

The fluidic device 16 may also be one (or a plurality) of several active devices. Non-limiting examples of which include an electrically operated valve, a pneumatically operated valve, or a hydraulically operated valve, or any combination thereof. If such an active device is employed, the manifold further comprises a sensing device 15, as shown in FIG. 2. The sensing device detects a specified physical phenomenon (or a combination of phenomena) and sends a signal to a controller 17. The controller 17 then causes the fluidic device 16 to be operated to an appropriate position on the basis of the phenomenon (or phenomena) detected. For example, the sensing device 15 could be a temperature sensor, such as, but not limited to, a thermocouple, a thermistor, or a resistance temperature detector. When the temperature sensor detects that the temperature has risen sufficiently to indicate that primary coolant is at or near the sensor, it sends a signal to the controller 17, which then closes the fluidic device 16. Thus, the air within the evacuation manifold 12 and associated piping has been evacuated to the surrounding atmosphere, while the primary coolant is directed into the receptacle 18.

Although the sensing device specifically described is a temperature sensor, it will be clear to the ordinarily skilled artisan that the sensing device could be one of many devices for sensing physical phenomena. Examples include, but are clearly not limited to, pressure sensors, flow sensors, and moisture sensors.

While the invention has been described as being part of a nuclear power plant system (either PWR or BWR), the ordinarily skilled artisan will appreciate that the invention could find utility in other technical arts as well.

While preferred embodiments of the present invention have been illustrated in detail, it is apparent that modifications and adaptations of the preferred embodiments will occur to those skilled in the art. However, it will be expressly understood that such modifications and adaptations are within the spirit and scope of the present invention as set forth in the following claims.

We claim:

1. A blow-down manifold for a nuclear power plant, comprising:

a main conduit section in fluid communication with the pressure relief system in the nuclear power plant;

at least one fluid exhaust conduit having a first end coupled to said main conduit section and a second end extending into a receptacle; and at least one fluidic venting device in fluid communication with said main conduit section and operatively connected thereto in parallel with said fluid exhaust conduit, wherein said fluidic device presents a first flow resistance to air and a second flow resistance, higher than the first flow resistance, to a fluid other than air for venting air from said manifold.

2. The blowdown manifold of claim 1, wherein the second end of said at least one fluid exhaust conduit extends into a fluid within the receptacle.

3. The blowdown manifold of claim 1, wherein said fluidic device comprises a valve.

4. The blowdown manifold of claim 3, wherein said valve is a spring-loaded check valve.

5. The blowdown manifold of claim 1, wherein said fluidic device exhibits low resistance to air flow but a high resistance to steam and/or water flow.

6. The blowdown manifold of claim 5, wherein said fluidic device comprises a venturi.

7. The blowdown manifold of claim 5, wherein said fluid device comprises a fluidic diode.

8. The blowdown manifold of claim 1, further comprising:

a sensor installed in said main conduit, and wherein said fluid device is controlled on the basis of a signal generated by said sensor.

9. The blowdown manifold of claim 8, wherein said sensor comprises a temperature sensor.

10. The blowdown manifold of claim 8, wherein said sensor comprises a flow sensor.

11. The blowdown manifold of claim 8, wherein said sensor comprises a pressure sensor.

12. The blowdown manifold of claim 8, wherein said sensor comprises a moisture sensor.

13. A blowdown manifold connected to pressure relief system piping in a nuclear power plant, comprising:

manifold means for receiving primary coolant flow from the nuclear power plant and directing the primary coolant flow therethrough;

exhaust piping means for receiving the primary coolant from the manifold and directing the primary coolant into a receptacle;

dual resistance flow means, in fluid communication with said manifold means and positioned so as not to be immersed in the primary coolant, for presenting (1) a first flow resistance to air and (2) a second flow resistance to the primary coolant, wherein the second flow resistance is higher than the first flow resistance for venting air from said manifold means.

14. The blowdown manifold of claim 13, wherein said exhaust piping means includes an end that extends into a fluid within the receptacle.

15. The blowdown manifold of claim 13, wherein said dual resistance flow means comprises a valve.

16. The blowdown manifold of claim 15, wherein said valve is a spring-loaded check valve.

17. The blowdown manifold of claim 13, wherein said dual resistance flow means comprises a venturi.

18. The blowdown manifold of claim 13, wherein said dual resistance flow means comprises a fluidic diode.

19. The blowdown manifold of claim 13, further comprising:

sensing means for sensing a physical phenomenon and generating a signal representative of the physical phenomenon; and controller means, connected to receive the signal from said sensing means, for operating said dual resistance flow means on the basis of the received signal.

20. The blowdown manifold of claim 19, wherein said sensing means comprises a temperature sensor.

21. The blowdown manifold of claim 19, wherein said sensing means comprises a flow sensor.

22. The blowdown manifold of claim 19, wherein said sensing means comprises a pressure sensor.

23. The blowdown manifold of claim 19, wherein said sensing means comprises a moisture sensor.

* * * * *